Figure 1:
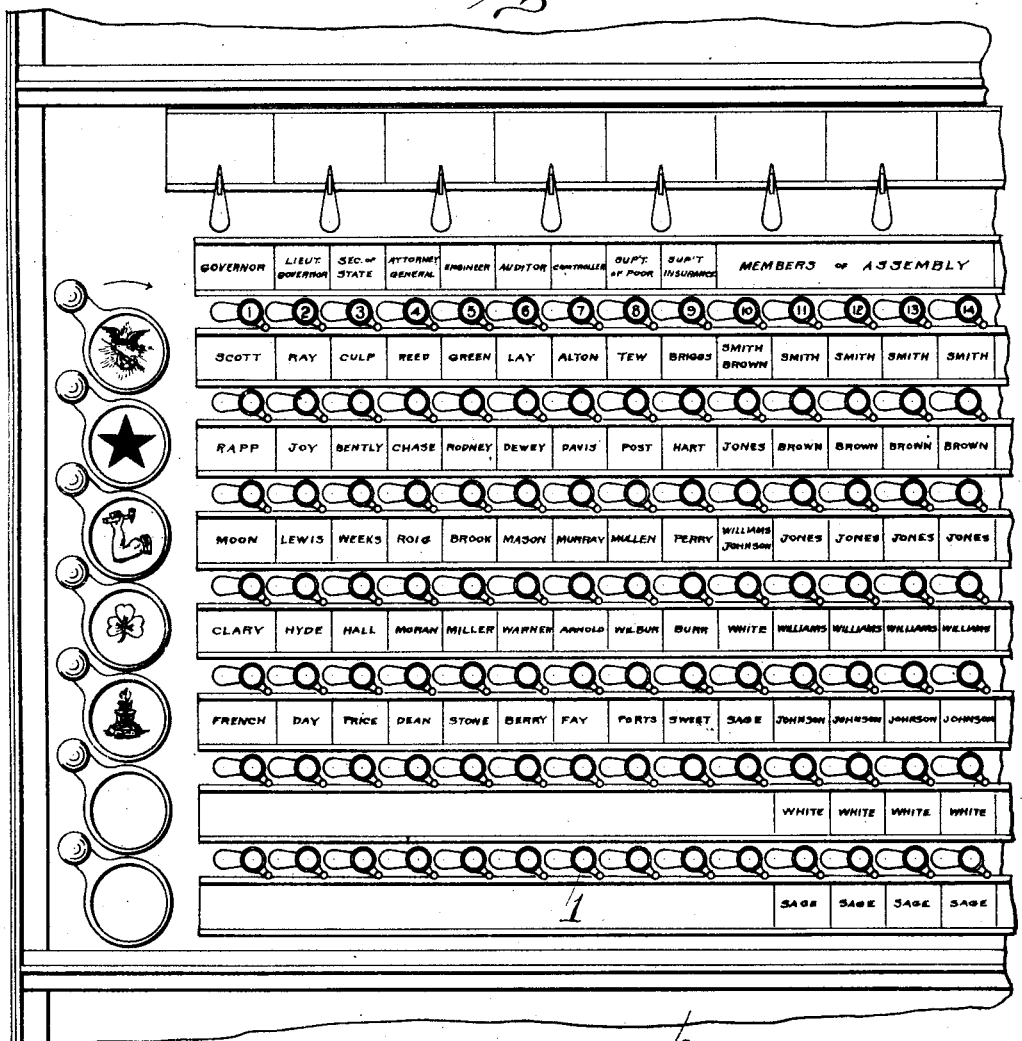

W. J. LAUSTERER.
CUMULATIVE VOTING INTERLOCK FOR VOTING MACHINES.
APPLICATION FILED JULY 29, 1908.

945,175.

Patented Jan. 4, 1910.
2 SHEETS—SHEET 1.

WITNESSES:
A. B. Corcilius.
Ethel C. Miller.

INVENTOR
William J. Lausterer
BY
Frank Reifer
ATTORNEY.

W. J. LAUSTERER.
CUMULATIVE VOTING INTERLOCK FOR VOTING MACHINES.
APPLICATION FILED JULY 29, 1908.
945,175.
Patented Jan. 4, 1910.
2 SHEETS—SHEET 2.
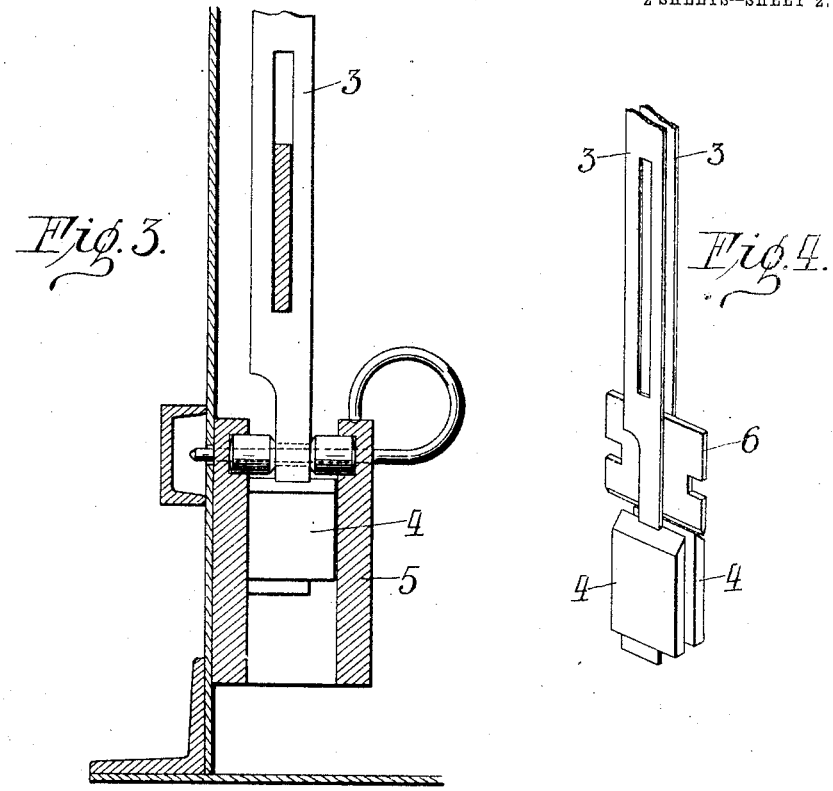
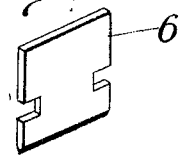
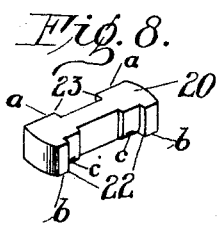
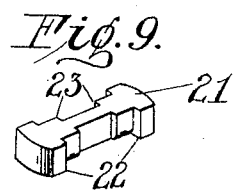
WITNESSES:
A. B. Corcilius
Ethel C. Miller
INVENTOR
William J. Lausterer
BY
Frank Keifer
ATTORNEY.

UNITED STATES PATENT OFFICE.

WILLIAM J. LAUSTERER, OF JAMESTOWN, NEW YORK, ASSIGNOR TO EMPIRE VOTING MACHINE COMPANY, OF ROCHESTER AND JAMESTOWN, NEW YORK, A CORPORATION OF NEW YORK.

CUMULATIVE-VOTING INTERLOCK FOR VOTING-MACHINES.

945,175. Specification of Letters Patent. Patented Jan. 4, 1910.

Application filed July 29, 1908. Serial No. 446,013.

*To all whom it may concern:*

Be it known that I, WILLIAM J. LAUSTERER, a citizen of the United States, residing at Jamestown, in the county of Chautauqua and State of New York, have invented certain new and useful Improvements in Cumulative-Voting Interlocks for Voting-Machines, of which the following is a specification.

My present invention relates to that class of voting machines described in my former patent No. 793,666, and in the patent issued to Frank Keiper No. 857,469, and has for its object the adaptation of the interlock therein described, to the purpose of cumulative voting as practiced in the State of Illinois in the election of members of the general assembly thereof and elsewhere.

In the State of Illinois the constitution at present provides that three representatives shall be elected to the general assembly from each senatorial district, and that in the election of these representatives, which occurs every two years, each qualified voter may cast as many votes for one candidate as there are representatives to be elected or may distribute the same or equal parts thereof among the candidates as he shall see fit, and the three candidates highest in votes shall be declared elected. Thus, candidates Smith, Brown, and Jones may be nominated by one party. The voter may at his option cast three votes for Smith alone, two votes for Smith and one vote for Brown, one and a half votes for Smith and Brown each, or one vote apiece for each Smith, Brown and Jones, or may cumulate them on any one other candidate or combination of candidates that he may see fit. It is the practice of the political parties in that State, where the senatorial district contains but a small majority for either party, for the two leading parties to nominate two candidates only, so that the voter in voting a straight ticket may count one and a half votes for each of these candidates, although he may at his option vote otherwise as above indicated. In other instances the party nominates but a single candidate, so that from the voter who votes a straight ticket, such candidate will receive three votes, while in other cases each or all the parties will nominate two candidates for this office, but in any case the voter is entitled to and must be permitted to bunch or distribute his votes as above indicated.

In order to permit a voter to vote as he is entitled to vote, I have arranged the names of candidates on the keyboard of the machine, repeating them as may be necessary, and interlocking them so as to secure all of the rights above described.

This invention is capable of use in other connections and for other purposes, and it consists in certain improvements and combination of parts hereinafter fully described, the novel features being pointed out in the claims at the end of this specification.

Figure 2:
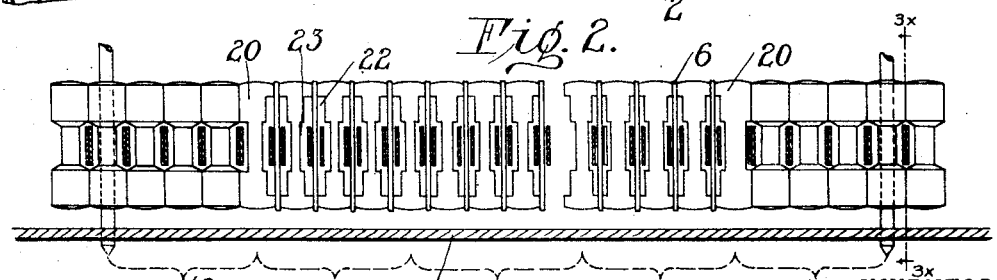

In the accompanying drawings, Figure 1 is an elevation of the keyboard of the machine, showing an arrangement of candidates thereon. Fig. 2 is a plan view of the interlocking mechanism as provided in the machine for that part of the keyboard that is occupied by the candidates for members of the assembly. Fig. 3 is a vertical transverse section on the line $3^x$—$3^x$ in Fig. 2. Fig. 4 is a perspective view of a pair of interlocking wedges in unvoted position, with a compensator positioned between them in the interlocking channel, the interlocking channel being omitted. Fig. 5 is a pin roller of the interlock. Fig. 6 is a solid roller of the interlock. Fig. 7 is the compensator. Figs. 8 and 9 are blocks cut after a special pattern, the details and purpose of which will be more fully hereinafter described.

Similar reference characters in the several figures indicate similar parts.

The ballot keys or indicators indicated by "1" are similar to those shown in my former patents Nos. 793,666 and 820,802, and consist of a lever pivoted in the keyboard 2 of the machine, and passing therethrough, to the rear of which are connected the interlocking rods or straps 3, shown in Figs. 3 and 4. These rods or straps are preferably formed of sheet metal, and have at their lower end wedges or thickened portions 4, coöperating with the separating or limiting devices located in the channel 5 shown in Fig. 3. This channel runs the whole length of the machine, and carries all the interlocking blocks and rollers with which engage the interlocking straps and wedges of all the keys shown on the keyboard in Fig. 1. For clearness, the channel is omitted in Fig. 2. Regularly contained in this channel are pin rollers and solid rollers such as are shown in Figs. 5 and 6. These rollers are of such a dimension that the sum of the diameters of four of them plus the thickness of one wedge, equals the distance between centers of the office lines of keys on the keyboard.

In the machine shown it may be assumed that there are seven party rows of keys and one row of irregular balloting devices (not shown), thus making eight voting devices in each office line on the machine, and all of these eight voting devices for each office line are interlocked in the one channel 5. The interlocking devices belonging to each office line are separated from each other in the interlocking channel by grouping pins, for which the interlocking channel is drilled with holes, spaced the same distance between centers as are the office lines of keys on the keyboard. Through these holes pass the grouping pins. These pins also pass through the pin rollers which occur at such places as shown in Fig. 5. Intermediate of the pin rollers are the solid rollers shown in Fig. 6. It will thus be seen that every fourth roller is a pin roller and the three intermediate rollers are solid rollers.

As described in the patents above referred to, both the pin and the solid rollers have an annular recess which is a little longer than the width of the interlocking strap, and a little deeper than the thickness of the strap. The wedges are arranged in pairs with their beveled edges together, and with their interlocking straps lying side by side in pairs, so that a pair of straps passes through each joint between the rollers. The system of wedges and rollers is normally so arranged that when one wedge is pulled to voted position in a single office line, no more wedges can be voted in that office line if the pin rollers are held in place by the grouping pins.

As shown in Fig. 1, office lines 10, 11, 12, 13, and 14 are included in the group of members of the assembly. The group is placed in this particular position because the first office line of the group will come on office line 10. As shown in the patent to Gillespie 849,123, the straight ticket bars can be disconnected beyond this point so that the operation of the party lever will operate keys 1 to 10 inclusive, and will not vote anything beyond that point, it being understood that this group is placed at the end of the ticket, so that the keys in the first office line of the group may be operated by the straight ticket keys and the balance of the group may be independent thereof. On the first office line of the group as shown in Fig. 1 are placed the names of those candidates which each party has nominated. The ballot shows that the first and third parties have nominated two candidates each, and the second, fourth and fifth parties have nominated but one candidate each for the office of assembly. Referring now to Fig. 2, it will be seen that the ordinary rollers are provided for office lines 10 and 14, but that a different form of interlocking device is provided in office lines 11, 12, and 13, and the construction and object of these interlocking devices I am now about to describe.

As above pointed out, the machine is normally provided with solid and pin rollers throughout the whole of the channel, but in this case when the office of members of the assembly or any other office in which cumulative voting must be provided for, occurs on the machine, the interlocking rollers are removed from office lines 11, 12, and 13 (13 interlocking rollers in all) and are replaced by blocks and compensators of the form shown in Figs. 7, 8, and 9. The block 20 shown in Fig. 8 is a special block that must be placed adjacent to the interlocking roller. But two of these blocks are used. One of these blocks is placed at the beginning of office line No. 11, and the other at the end of office line No. 12 as is shown in Fig. 2. The block 20 is formed with a single recess 23 cut on one side, and a double recess 22 and 23 cut on the other side of it. The recess 23 is intended to nest with the strap only and is a little longer than the width of the strap, and the recess 22 is intended to nest with the interlocking wedge wholly or in part or to a greater or less extent, which extent is dependent on the depth of the recess. The recess 22 is a little longer than the width of the wedge. The recess 23 is cut centrally of the recess 22. The block 20 has interlocking surfaces as follows;—$a, a$, where it contacts with the adjacent interlocking roller or the wedge that separates it from the adjacent roller, $b, b$, where it contacts with the adjacent compensator, and $c, c$, where it contacts with the interlocking wedge, if the wedge is placed in voted position. The intermediate blocks 21 are cut symmetrically with the double recess 22 and 23 on each side of each block. Each block 21 has the interlocking surfaces $b, b$, and $c, c$, similar to the blocks 20 but does not have the interlocking surfaces $a, a$. The central recesses 23 of the blocks 20 and 21 may all be cut of the same depth, but the longer recesses 22 are cut of varying depths as follows: The depth of the longer recesses 22 in all of the blocks of a given office line are the same, but the said recesses are of different depths in different office lines. The object of cutting the recesses 22 of different depths will now be explained.

The thickness of the wedge may be taken for example at .1 of an inch. If now the depth of the recess 22 above referred to in each of the blocks is .1 of an inch, the wedge can move freely into and out of that recess without causing the movement of the block. The wedge will nest in the recess, but will not move a block away from the adjacent compensator 6 that lies without the recess. If, however, instead of the recess being .1 of an inch deep, it is ⅔ of .1 of an inch deep, then when the wedge is drawn into voted position the recessed block will be moved away from the adjacent block by the thickness of the wedge that is in excess of the depth of the recess; that is, by ⅓ of .1 of an inch, and this is the effective displacement of each of the wedges in office line No. 11, due to the fact that the large recess in each block is ⅔ of .1 of an inch in depth. In office line No. 12 the interlocking blocks have large recesses of a depth of ½ of the thickness of the wedge, so that when the wedge is placed in voted position, it will displace the block by ½ of the thickness of the wedge. In office line 13, the depth of the recess is ⅓ of the thickness of the block, so that when a wedge is pulled to voted position in the 13th office line, the blocks will be displaced by ⅔ of the thickness of the wedge. The wedges and interlocking rollers in the 14th office line are the same as those found in the 10th office line. In the 11th, 12th, and 13th office lines, there is placed after each interlocking block so as to be interposed between them, a compensator 6 similar to that shown in Figs. 4 and 7. This compensator 6 is a plate having a beveled lower edge, and having recesses 30 by which it engages the upper flanges of the channel 5, and by which it is held in place against vertical movement but is permitted to slide longitudinally of the channel. The compensators are in reality interlocking blocks, but are called compensators for convenience of reference, and to distinguish them from the blocks 20 and 21, which are of a different type. The displacement when the wedge is pulled to position is between the block and its adjacent compensator instead of between two consecutive blocks. These compensators are not used between consecutive rollers as it is obvious they are unnecessary where the surfaces of the rollers that interlock with the wedges come directly in contact with each other when the wedge is withdrawn. In such case the full displacement of the wedge is secured by the interlocking surfaces of consecutive rollers being directly in contact. The thickness of the special blocks does not correspond with the diameter of the rollers, but is less than the diameter of the rollers by the thickness of the compensator. Otherwise, the blocks could be formed as rollers, and they may be so formed even with the diminution in their thickness, if the vertical lost motion which they would then have in the channel is not considered objectionable. The block 20 at the beginning of office line No. 11 and at the end of office line No. 12 is substantially similar to that shown in Fig. 8, and all of the intermediate blocks are similar to that shown in Fig. 9, the only difference being in the depth to which the long recess 22 is cut, which of course differs in each office line as above explained. The short recess may be omitted in all blocks in which the depth of the long recess is greater than the thickness of the interlocking strap. Where the depth of the long recess is less than the thickness of the interlocking strap, a short recess could be supplied so as to prevent a displacement by the strap of the blocks or the blocks and compensator.

In the system as shown in Fig. 2, .1 of an inch of space is provided for the voting of wedges in the entire group of five office lines. If one wedge is pulled in to voted position in either the 10th or 14th office line, no other wedges can be voted in the group, because a wedge in either the 10th or 14th office line will displace the full .1 of an inch. If a wedge is placed in voted position in the 11th office line, it will still displace ⅓ of .1, and there will be room to vote a second and third wedge in that same office line, or instead another wedge can be voted in the 12th or 13th office line, which wedge will displace ½ of .1. If a wedge is voted in the 11th and 12th office lines each, the two wedges will displace a third of a tenth plus a half of a tenth of an inch or ⅚ of .1 of an inch, leaving ⅙ of .1 of an inch still open, but as there is no wedge that will fit such an opening, and as no block is recessed to the extent that a wedge in separating it from its neighboring compensator will displace it simply that much and no more, it is obvious that this space is not sufficient to permit the voting of another wedge. In office line No. 12 any two interlocking wedges could be placed in voting position, each of these wedges displacing ½ of .1 of an inch. In the 13th office line but one interlocking wedge can be placed in voted position, displacing ⅔ of .1 of an inch, leaving ⅓ of .1 of an inch to be displaced elsewhere, which can be done by voting one wedge in office line No. 11, but after a wedge is voted in office line No. 13, a second wedge cannot be voted in any other office line except No. 11, because any wedge in any other office line would make a displacement of more than ⅓ of .1 of an inch.

It will be understood that in the arranging of this system, the wedges that are originally built into the machine are not disturbed, but that each of them has a uniform thickness which in this case is supposed to be .1 of an inch. The variation is confined to the blocks which are put into the machine instead of the rollers which are removed from it for this particular emergency. For any other purpose than cumulative voting, the machine would naturally be restored to its original condition by removing the special interlocking blocks and by replacing the original interlocking rollers. It is also understood that the same result can be secured by using the rollers as they normally occur in the channel, and substituting wedges of different thickness for those used normally in the machine. In such case the substituted wedges in the 11th office line would have ⅓ of the thickness of the wedges in the 10th and 14th office lines, the wedges in the 12th office line would be ½ and the wedges of the 13th office line would be ⅔ of the normal thickness. If such wedges are used I prefer to use them in connection with an auxiliary channel, so that the wedges and rollers in the main interlocking channel need not be disturbed. In such case the auxiliary channel would embrace the five or more office lines of the group, and the interlock would be effective in the auxiliary channel only. The intermediate grouping pins would be removed from the corresponding office lines in the main channel, so that the wedges and rollers therein would not interfere with the voting of the keys.

Referring now to Fig. 1, in view of the foregoing explanation, it will be seen that if any key is voted in the 10th office line of the assembly group, no other keys can be voted in the group. It is arbitrarily directed that because of the relation heretofore explained, the counters of each of the keys shall be given a multiplying factor which is in proportion to the displacement of its wedge, and inversely proportioned to the depth of the cut in the block with which it coöperates. Thus, the wedges in the 11th office line displace the least, which is ⅓ of .1 of an inch, and the wedges in the 10th and 14th office lines displace the most, which is .1 of an inch for each wedge, or three times the displacement of the wedge in the 11th office line. Taking now the displacement in the 11th office line as the unit, each counter in the 11th office line will be given a multiplying factor of 1. The counters in the 10th and 14th office lines will each be given a multiplying factor of 3. The counters in the 12th office line will each be given a multiplying factor of 1½, and the counters in the 13th office line will each be given a multiplying factor of 2, the factor being in proportion in each instance to the effective displacement of the wedge attached to that key, which displacement determines the number of keys of that class that can be voted.

Referring again to office line No. 10, and assuming that the counter of the first key shows 100 votes, it will have, using the multiplying factor of 3, in reality 300 votes recorded thereon, half of which belong to Smith, and the other half of which belong to Brown. If the second counter in the 10th office line shows 100 votes, with its multiplying factor of 3, it will likewise credit to its candidate in reality 300 votes, all of which belong to the candidate Jones. The same is true as to a third, fourth and fifth counter, the indication of the counters in that row being multiplied by 3, and being credited directly to one candidate, if but one candidate appears in connection therewith, or is divided between the two or more candidates if that number appear in connection therewith. In the 11th office line it will be seen that Smith's name is repeated in connection with the first key and counter, and in that case if his counter in the 11th office line shows for example ten votes, the result so indicated will be multiplied by the multiplying factor of 1 and added to the votes credited to Smith by the counter in the 10th office line. Likewise Smith's name appears in connection with the first counter on the 12th office line, and if he has received thereon say 12 votes, such indication would be multiplied by the multiplying factor of 1½, making this counter credit to Smith 18 votes, to be added to the votes credited to him by the other counters. Likewise in the first key and counter of the 13th line appears the name of Smith, and we will say that the counter of this key shows 6 votes. This multiplied by the factor of 2 would give 12 votes to be added to the votes of the previous counters. Smith's name also appears in connection with the first key on the 14th line, and the vote on the key which we will assume is 9, should be multiplied by 3 making 27, which should also be credited to Smith. Thus Smith would be credited with 150 votes from the first counter, 10 from the next counter, 18 from the 3rd, 12 from the 4th, and 27 from the 5th, making 217 votes in all. Likewise, the vote would be audited in the same way for Brown, and in this connection it will be seen that Brown's name, while it appears on the first party row in the 10th office line, appears on the 2nd party line in the 11th, 12th, 13th and 14th party lines. This, however, is not objectionable in practice, as the effect of the straight ticket key stops at the 10th key and does not affect the keys beyond. As to Jones, his first and last counter will have a multiplying factor of 3, the same as in the case of the counters of Smith and Brown, but the total vote of his first counter will be credited to him alone, instead of being divided with another candidate. In the same manner the vote is canvassed from the other counters and credited in its proper proportion to the respective candidates. It will thus be seen that with this arrangement each candidate is enabled to receive three votes, two votes, 1½ votes, or one vote from each and all of the voters, and that the votes so given will, by the regulation of the interlocking mechanism and by the use of the multiplying factor which is determined by the interlocking mechanism, correctly represent the vote to be credited to the respective candidate.

The blocks need not be confined to the dimensions above enumerated, as it is obvious that by varying the depth of the cut the effective displacement of the wedge will be varied as well, so that any interlocking effect may be secured. It is apparent that different wedges in the same office line may be given a different displacement to suit the needs of the occasion, and if the blocks and compensators when assembled in the machine are found to be undersized, the extra space may be taken up by the use of additional compensators or by replacing one or more of the regular compensators by compensators of greater thickness. It is also true that this particular interlocking mechanism may be placed anywhere in the machine that the needs of the occasion requires, but that the position above described is perhaps the most effective in connection with straight ticket voting: namely, placing the group at the end of the ticket with the first office line occurring on an office row that will be operated by the party levers, and the remaining office lines on office rows that will not be affected by the party levers.

Having thus described my invention, what I claim as new and patentable is as follows:

1. In an interlocking mechanism, the combination with a plurality of sets of movable and abutting blocks, the blocks of each series having recesses of different depths, of a plurality of series of wedges, one series for each set of blocks, independently movable transversely of the plane of movement of the blocks, and stops for limiting the movement of the blocks.

2. In a voting machine interlock, the combination of an interlocking wedge, a pair of interlocking blocks having interlocking surfaces to contact with said wedge, said surfaces being normally held apart a predetermined distance less than the displacement of the wedge, said wedge being movable to interlocking position to separate said surfaces by the thickness of the wedge.

3. A pair of interlocking compression members normally in direct abutment inclosing between them an opening, an interlocking wedge positioned to enter said opening, said opening equaling the wedge in width, but being less than the wedge in thickness, whereby the interlocking members will be separated by the wedge a distance equal to the thickness of the wedge, minus the width of the opening when the wedge is inserted between the blocks.

4. In a voting machine interlock a series of interlocking blocks and wedges for interlocking therewith, each of said wedges having the same thickness, said blocks having surfaces thereon for interlocking with said wedges, said surfaces lying adjacent and being normally held apart a predetermined distance less than the displacement of the wedge whereby the displacement of the wedge is correspondingly reduced.

5. In a voting machine interlock a series of interlocking blocks and wedges for interlocking therewith, each of said wedges having the same thickness, said blocks having surfaces thereon for interlocking with said wedges, said surfaces lying adjacent and being normally held apart a predetermined distance less than the displacement of the wedge whereby the displacement of the wedge is correspondingly reduced, said adjacent surfaces on different blocks being held apart different distances whereby wedges of uniform thickness have different interlocking effects in different parts of the series.

In testimony whereof I affix my signature in presence of two witnesses.

WILLIAM J. LAUSTERER.

Witnesses:
ETHEL C. MILLER,
ALEXANDER B. CORCILIUS.